United States Patent [19]
Cappelen, Jr. et al.

[11] 3,738,382
[45] June 12, 1973

[54] METHOD FOR THE STERILIZATION OF A SYSTEM FOR PREPARATION OF A LIQUID MIXTURE

[76] Inventors: Christian Cappelen, Jr., Rikshogpitalet, Oslo; Lars Grimsrud, Norges Tekniske Hogskole, 7000 Trondheim, both of Norway

[22] Filed: Nov. 10, 1970

[21] Appl. No.: 88,419

[30] Foreign Application Priority Data
Nov. 11, 1969   Norway..........................4462/69

[52] U.S. Cl. .................................... 137/340, 137/1
[51] Int. Cl. ........................................... F16k 49/00
[58] Field of Search........................ 137/340, 341, 1

[56] References Cited
UNITED STATES PATENTS

| | | | |
|---|---|---|---|
| 3,457,944 | 7/1969 | Cary et al. | 137/341 |
| 3,348,386 | 10/1967 | Forshee | 137/1 X |
| 3,412,741 | 11/1968 | Mills | 137/1 |
| 3,468,322 | 9/1969 | Katzer | 137/1 |
| 3,534,765 | 10/1970 | King et al. | 137/341 |

*Primary Examiner*—Samuel Scott
*Attorney*—Watson, Cole, Grindle & Watson

[57] ABSTRACT

A self-sterilizing liquid mixer system is provided for the preparation of a mixture of a carrier liquid and a concentrate, particularly for the production of a dialysis liquid for a dialyser, connected to the mixture outlet conduit of said system, a return conduit receiving used liquid mixture from the dialyser to be discharged from the system through a discharge outlet.

In the inlet conduit of the carrier liquid, series connected heating and outgasing means are provided normally operative to heat said carrier liquid close to its boiling point and subsequently outgasing the same through a gas outlet to the atmosphere. For the sterilizing of the system after an inoperative period the supplies of the carrier liquid and the concentrate are cut off, while said inlet conduit of the carrier liquid is connected with the discharge outlet, and said mixture outlet conduit is connected to the return conduit, simultaneously pressure dependently closing the gas outlet by means of a loaded closure.

These measures enable a closed circulation of the liquid present in the system and a heating of the circulating liquid by means of said heating means to a selected sterilizing temperature well above said boiling point and determined by the pressure dependent, loaded closure of the gas outlet.

1 Claim, 1 Drawing Figure

PATENTED JUN 12 1973　　　　　　　　　　　　　　3,738,382
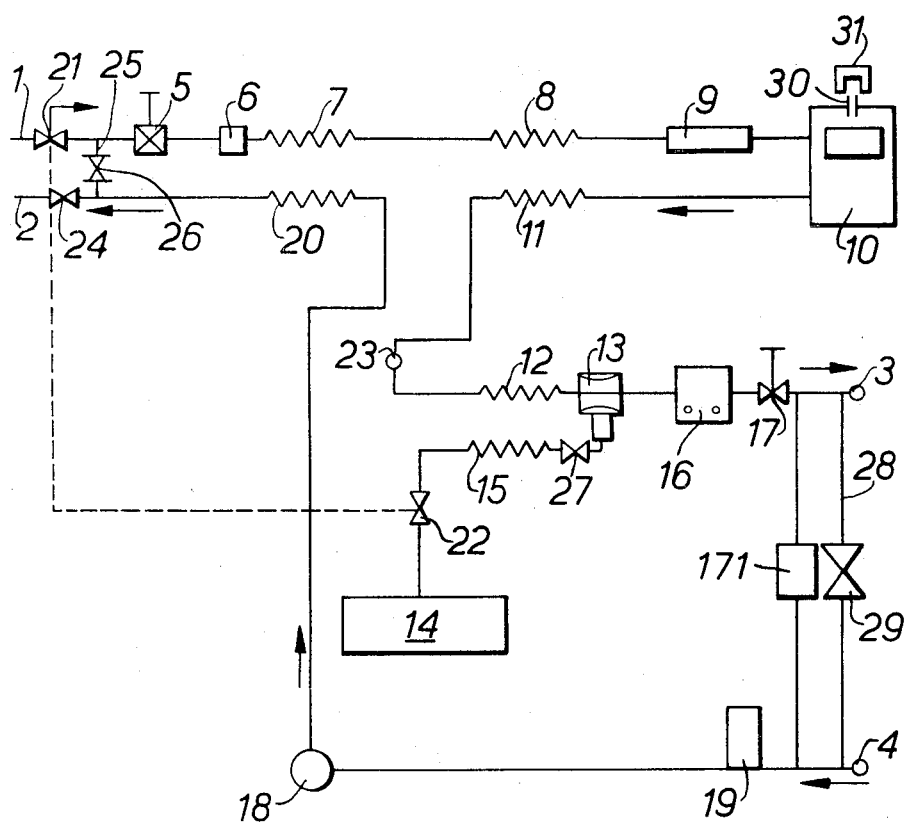

METHOD FOR THE STERILIZATION OF A SYSTEM FOR PREPARATION OF A LIQUID MIXTURE

The present invention relates to a method for the sterilization of a system for preparation of a mixture of a carrier liquid and a concentrate, particularly for production of a dialysis liquid. When such systems are intermittently operated, e.g., only in the daytime, or, as in the case of a dialysis system, may be out of operation during shorter or longer periods, it is necessary to ensure that the complete system is sterile before the apparatus utilizing the liquid mixture, e.g., a dialyser, is connected to said preparation system.

The present method according to the invention, is particularly suitable for sterilization of preparation systems of the type where the carrier liquid is heated close to its boiling point and, at this temperature, is subjected to outgasing at atmospheric pressure, the method implying that the entire preparation system in a simple way is thoroughly flushed with carrier liquid at sterilization temperature, and without employing significant auxiliary equipment.

According to the invention this is achieved by a method characterized by the fact that the carrier liquid, after cutting off the carrier liquid and concentrate supplies, interconnecting the inlet for carrier liquid and the outlet for used liquid mixture, short-circuiting the apparatus utilizing the liquid mixture and pressure-dependently closing the outgasing outlet, is heated to the sterilization temperature by means of heating means already present in the system. As a consequence of the above closing and short-circuiting operations, the preparation system will form a closed carrier liquid circuit. Further, as a result of the pressure-dependent closing of the outgasing outlet, the temperature of the carrier liquid together with the pressure of the same, will be brought to the desired values by aid of the heating means which the system is provided with for ordinary operation. At the same time the circulation pump of the system will drive the superheated carrier liquid around said closed circuit.

To carry out the present method in a system of the given type, consequently only simple valve means for closing and short-circuiting operations are required, so that such system in a very simple manner may be adapted to operate in accordance with the method according to the invention.

The accompanying drawing discloses a schematical diagram of a preparation system, e.g., for a dialysis liquid of the indicated kind, together with said simple auxiliary equipment necessary to perform the method according to the invention.

In the drawing 1 designates an inlet conduit for carrier liquid, while 2 designates the outlet for used dialysis liquid, and 3 - 4 are the connection terminals for the dialyser. In the inlet conduit a pressure regulator 5 and a pressure switch are disposed in the usual way. After passing through these components, the carrier liquid flows through the secondary sides 7 - 8 of two heat exchanges, and a heating device 9 to outgasing means 10. After being subjected to an outgasing process in 10, the carrier liquid is conveyed through the heat exchanger primary 11 corresponding to said secondary 8, and the primary side 12 of a further heat exchanger to a mixing device 13, where a concentrated dialysis liquid, supplied from a tank 14, is added to the carrier liquid. Before entering the mixing device 13, however, said concentrate passes through the heat exchanger secondary 15 corresponding to said primary 12. Thereafter, the dialysis liquid mixture prepared in the mixing device, is conveyed through measuring means 16 and a valve 17, provided with a shunt 171 across the dialyser terminals 3 - 4, to the dialyser input terminal 3. After passing the dialyser, the used dialyser liquid returns to the preparation system via the terminal 4 and thereafter flows through a pressure meter 19 and a pump 18, to be ejected through said outlet 2 after passing through the heat exchanger primary 20 corresponding to said secondary 7. An inlet valve 21 in the conduit 1 may be arranged to operate as a unit with an outlet valve 22 in the concentrate conduit from the tank 14, to obtain a common control of the two valves. Between the heat exchangers 8, 11 and 12, 15, a temperature regulator 23 with associated heating means, may be disposed.

By means of heat exchange with used dialysis liquid in the heat exchanger 7, 20 and with outgased carrier liquid in the heat exchanger 8, 11, and heat supplied by heating device 9, the temperature of the carrier liquid will be raised to a value close to the boiling point, i.e., in the case of ordinary pipe water, to a temperature of 90°–95°C. Thus, the outgasing will take place automatically in the outgasing means 10 under atmospheric pressure conveyed through the aperture 101. The outgased carrier liquid ejected from the means 10, gives off part of its heat content in the heat exchanger 8, 11, and flows to the primary side 12 of the heat exchanger 12, 15 at a temperature of 37°–40°C, this temperature possibly being adjusted by means of the regulator 23. In the heat exchanger 12, 15 further heat is given off to the concentrate supplied from the tank 14. Thus, both the carrier liquid and the concentrate may have attained suitable temperatures before being mixed in the device 13, in order to supply dialysis liquid mixture of correct temperature to the dialyser via the input terminal 3. The pressure at the terminal 3 may be adjusted by means of the valve 17 with associated shunt 171.

From the dialyser output terminal 4, the used dialysis liquid is conveyed to the meter 19 and the pump 18 at a temperature of approximately 37°C, and thereafter gives off a part of its heat content in the heat exchanger 7, 20 to the fresh liquid injected through the inlet 1.

By means of the common control of the valves 21 and 22 the dialyser inlet is safeguarded against a supply of unmixed liquid.

The mixing device 13 may be provided with any suitable control means for ensuring correct mixture ratio, under the control of the measuring means 16.

The system described up to now, constitutes no part of the present invention. But, such system need only to be provided with a few simple auxiliary components to make it suitable for carrying out the method according to the invention.

Between the inlet conduit, downstream of the valve 21, and the outlet conduit 2, ahead of a stop valve 24, a short-circuit conduit 25 with a valve 26 is arranged. Further, between the secondary 15 of the heat exchanger 12, 15 and the mixing device 13, a stop valve 27 is disposed, and between the dialyser terminals 3 - 4 there is arranged a short-circuit conduit 28 with a stop valve 29. Finally, the gas outlet 30 from the outgasing device 10 is provided with a weight-loaded safety valve 31, e.g., of the type used on ordinary domestic pressure cookers.

When the system is to be sterilized before normal operation and subsequent to a passive period, first the stop valve 27 and the outlet valve 24 are closed, the shunt valve 29 is open and the inlet valve 21 temporarily remains open. Then the pump 18 is started to fill the system with circulating carrier liquid, before shutting the valve 21, adjusting the valve 31 and starting the heating device 9.

The preparation system is now isolated to allow a closed-path circulation of heated carrier liquid within the system by means of the pump 18. Because of the safety valve 31, however, the pressure and temperature of the liquid may rise above the atmospheric pressure and the corresponding boiling point, respectively. Thus, under the control of the weight adjustment of the safety valve 31, the system will be flushed with superheated carrier liquid to effect the sterilization of the same.

After a suitable cooling of the system, still filled with carrier liquid, it will be ready for normal operation with the addition of concentrate from the tank 14 and outgasing in the device 10 with outlet to the atmosphere.

We claim:

1. Self-sterilizing liquid mixer system comprising first and second inlet conduits for respectively supplying a first and a second liquid to a mixing device, series connected heating and outgasing means in said first inlet conduit, and which normally are operative to heat the first liquid close to its boiling point and subsequently outgasing the same through a gas outlet to the atmosphere, an outlet conduit from said mixing device and connectable to an apparatus utilizing the prepared liquid mixture, and a return conduit operative to receive used liquid mixture from said apparatus and to discharge the same through a discharge outlet, the system further comprising means for, after cutting of the supplies of said first and second liquid, respectively interconnecting the inlet conduit of the first liquid and the discharge outlet, and the outlet conduit of the mixing device and the return conduit, and simultaneously pressure-dependently closing the gas outlet, in order to enable closed liquid circulation through the system and heating of the circulating liquid by means of said heating means to a selected sterilizing temperature well above said boiling point and determined by said pressure dependent closing.

* * * * *